L. EBERLINE & F. M. WANZER.
BELT STRETCHER.
APPLICATION FILED NOV. 25, 1908.
944,958.
Patented Dec. 28, 1909.
2 SHEETS—SHEET 1.
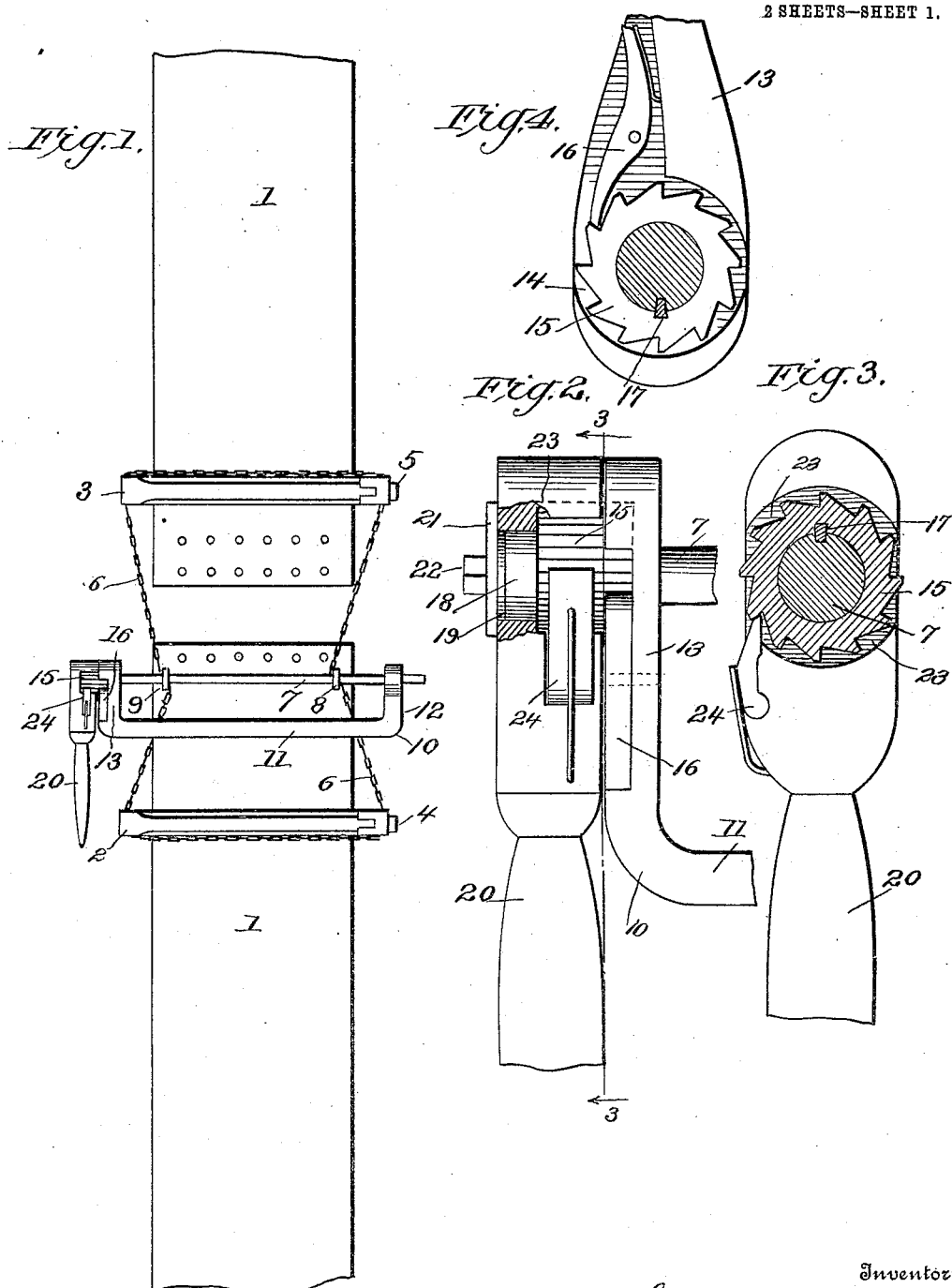

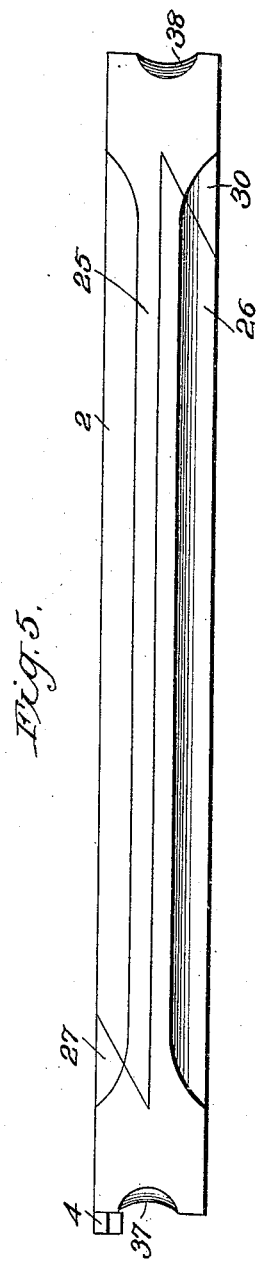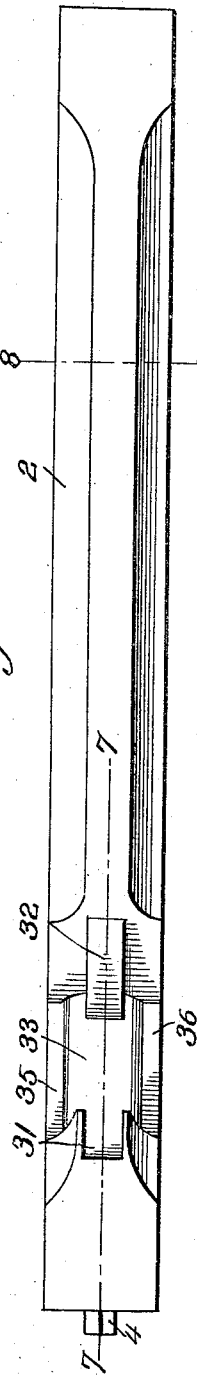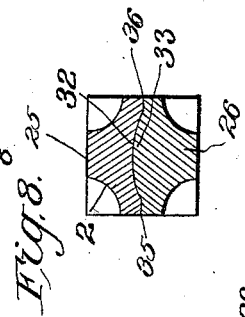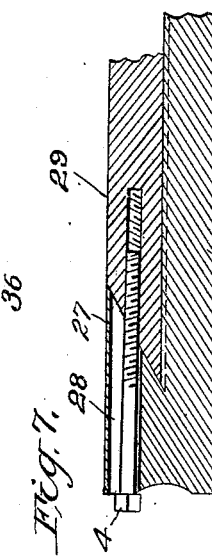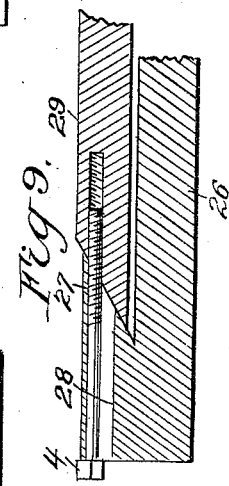

UNITED STATES PATENT OFFICE.

LEONARD EBERLINE AND FRANK M. WANZER, OF BIGLAKE, WASHINGTON.

BELT-STRETCHER.

944,958.  Specification of Letters Patent.  Patented Dec. 28, 1909.

Application filed November 25, 1908. Serial No. 464,352.

*To all whom it may concern:*

Be it known that we, LEONARD EBERLINE and FRANK M. WANZER, citizens of the United States, residing at Biglake, in the county of Skagit and State of Washington, have invented certain new and useful Improvements in Belt-Stretchers; and we do hereby declare the following to be a full, clear, and exact description of the invention, such as will enable others skilled in the art to which it appertains to make and use the same.

This invention relates to improvements in belt stretchers, and particularly to means for gripping large belts and holding the ends together in order to permit lacing or securing of the ends while the belt is in position on pulleys, and has for its object the provision of improved means for gripping and drawing together a belt without injuring the same.

Another object of the invention is the construction of gripping or clasping members adapted to clasp the ends of a belt and means for drawing the gripping members together for drawing and holding the ends of the belt in proximity while the belt is in position on its pulleys.

A further object in view is the provision of a gripping means which is adapted to grip the ends of a belt and means for causing the gripping means to grip the belt with an additional pressure when the ends of the belt are drawn together.

A still further object in view is the provision of a pair of gripping members adapted to grip the ends of a belt, a flexible means passing over both of said gripping members, and means for winding the means passing over the gripping members for causing the gripping members to take an additional grip on the belt and to draw the ends of the belt in proximity to each other in order that the same may be secured together while the belt is in position.

With these and other objects in view the invention comprises certain novel constructions, combinations and arrangement of parts as will be hereinafter more fully described and claimed.

In the accompanying drawings: Figure 1 is a top plan view of the belt stretcher applied. Fig. 2 is an enlarged detail fragmentary view of the pulley construction embodying certain features of the invention. Fig. 3 is a section through Fig. 2 on line 3—3 looking in the direction indicated by the arrow. Fig. 4 is a section through Fig. 2 on line 3—3 looking in the opposite direction indicated by the arrow. Fig. 5 is a side elevation of the belt gripping member. Fig. 6 is a top plan view of the structure shown in Fig. 5, the same being shown slightly open for the purpose of illustration. Fig. 7 is a section through Fig. 6 approximately on line 7—7, except that the same is shown in a closed position. Fig. 8 is a section through Fig. 6 on line 8—8. Fig. 9 is a fragmentary sectional view similar to Fig. 7, except that the same is shown separated ready for the insertion of the belt.

In using large belts it is usually necessary if not always necessary to run the same taut or tight over the pulleys, and in order to make the same a proper length it is necessary to place the belt on the pulleys and then secure the ends together. If the ends were secured together while off the pulley it would be impossible to apply the belt to the pulleys. The belt stretchers forming the present invention are adapted to engage the ends of belts of this character and pull the same together in order that the ends may be laced or otherwise secured together while the belts are in position on their pulleys.

In constructing a device according to the present invention a pair of gripping members are provided that grip the ends of the belt. Around the ends of the gripping members is passed a chain or other flexible member which is then secured to a drum that when wound will pull the chain first against the gripping members and cause the same to give an additional grip, and will then gradually draw together the gripping member which pulls therewith the ends of the belt. The rotation of the drum is continued until the ends of the belt are brought together when it is desired to lace the belt, but if it was desirable to rivet the ends together the movement of the drum would be continued until the ends overlap to any desired extent. During this time the belt is on its pulleys and as soon as the ends of the belt have been secured together and the belt stretcher removed the belt is ready for operation.

In order that the invention may be more clearly understood an embodiment of the same is shown in the accompanying drawings in which 1 indicates a belt and 2 and 3 indicate clasps or gripping members for gripping the belts near the ends thereof.

Each of the clasps is provided with set screws 4 and 5 respectively which cause the clasps to clamp or grip the belt to a greater or less extent. Passed around the ends of the gripping members 2 and 3 is an endless chain 6, though a cable, rope, or other material may be used if desired. The chain 6 passes diagonally through a shaft 7 acting as a winding drum for winding the chain 6. Surrounding the shaft or drum 7 at the point through which the chain passes are rollers 8 and 9 which engage belt 1 and spaces the drum or shaft 7 therefrom for affording space for the winding of the chain. By passing chain 6 diagonally through drum 7 and having rollers 8 and 9 positioned above the diagonal opening through which the chain passes the chain is compelled to wind on opposite sides of the rollers, and as will be evident in opposite directions for tightening the chain around the clamping members 2 and 3 and drawing the clamping members toward each other. As drum 7 is rotated the slack in the chain will be first taken up and then the chain will clamp against the ends of the clamping members 2 and 3 for causing an auxiliary clamping effect, and finally the strain on the chain will cause the clamping members and the ends of the belt to approach each other. Any desired number of rollers 8 and 9 may be used according to the width of the belt, though only two are necessary for separating the chain during the winding action thereof.

Drum 7 is mounted in a holder or frame 10 that has a body portion 11 passed across the belt which body portion is adapted to press against chain 6 when the chain is under tension. Body portion 11 has formed on the ends thereof turned down end members 12 13 through which the drum passes. End member 13 is formed with a cut out portion 14 for accommodating a ratchet wheel 15, and also a pawl 16 that permits movement of the ratchet wheel 15 in one direction only. The opening in the end member 12 is sufficiently large for permitting the shaft or drum 7 to be passed therethrough sufficiently far for permitting the opposite end to come opposite an opening through which the same is passed before wheel 15 is applied. After drum 7 has been positioned in the holder 10 ratchet wheel 15 is placed on the end of the drum and a key 17 fitted in position for causing the drum 7 to rotate with the ratchet wheel. Ratchet wheel 15 is formed with a smooth extension 18 over which a handle 2 is passed, an opening 19 accommodating the smooth portion 18. A cap or washer 21 is also provided with a securing bolt 22 that engages drum 7 for holding the handle 20 in position. Handle 20 is also formed with a hollowed out portion 23 for accommodating part of ratchet wheel 15. Mounted in handle 20 is also a pawl 24 that engages ratchet wheel 15 so that when handle 20 is moved in one direction the ratchet wheel 15, together with drum 7 is rotated, but when the handle is moved in the opposite direction the ratchet and drum are not rotated but held positively in position by pawl 16 pivotally mounted on end 13. By this construction and arrangement whenever handle 20 is rotated in the proper direction the drum 7 will be rotated for causing clamping members 2 and 3 to approach each other and by the provision for holding the ratchet 15 with its pawl 16 no reverse movement will be permitted drum 7, and consequently the ends of the belt 1 will be held in the position into which they have been drawn by the rotation of the drum. By the particular construction and arrangement of handle 20 a back and forth movement thereof will give a rotary movement to the drum, and this back and forth movement is of particular advantage in some instances, as for instance when the belt is near the ceiling or near the wall.

Clamping members 2 and 3 are formed identical and therefore a description of one will be sufficient for both. These clamping members are formed as more clearly seen in Figs. 5 to 8 inclusive to which particular reference is made. Clamping member 2 is formed in two parts 25 and 26, that are identical in construction, except for the binding screw 4. At one end of part 26 is formed a hook shaped portion 27 through which is formed an aperture 28 that accommodates bolt 4 which in turn engages a threaded opening 29 in part 25. Part 25 is also formed with a hook shaped end 30 similar to hook shaped end 27 and arranged to engage part 26 at the same time that hook shaped end 27 engages part 25, as clearly shown in Fig. 5. The hook shaped ends 27 and 30 are formed with grooves 31—31 which are adapted to accommodate corresponding lugs or tongues 32—32. The tongues 32—32 and grooves 31—31 are adapted to hold the parts 25 and 26 from becoming separated when clamped in position and chain 6 has been brought into tension. The bolt 24 will also assist in holding the parts together as well as in clamping the parts against the belt positioned therebetween. Part 26 is formed with a raised portion or rib 33 and part 25 is formed with a groove 34 that registers with the raised portion 33 by which a tortuous passageway is provided for the belt as the same passes through the gripping member, especially when taken with the flat portions 35 and 36. The ends of the clamping member are also formed with grooves or notched out portions 37 and 38 used for guiding the chain 6 in its movement. As the chain 6 passes over the notched out portions 37 and 38 there will be a tendency to force parts 25 and 26 together in addition to the tendency caused by bolt 4. This will afford an extra gripping tension for positively holding the belt from slipping during the operation of pulling the ends of the same together.

What we claim is:

1. In a belt stretcher, a pair of gripping members formed into parts slidable in relation to each other and having cam shaped surfaces thereon for moving the parts together when the same are slid in one direction, means engaging the ends of said gripping members for sliding the same for causing the parts to grip said belt, and a rotating member engaging said means for moving the same for causing said means to act on the parts of said gripping member and at the same time draw said gripping members toward each other.

2. In a belt stretcher, a pair of clamping members, means for causing said clamping members to grip the end of a belt, a chain engaging the ends of said gripping members for affording auxiliary clamping means, and a drum acting on said chain for causing the same to press against the ends of said gripping members and at the same time draw said gripping members and the ends of said belt toward each other.

3. In a belt stretcher, gripping members for engaging said belt, a chain acting on said gripping members for causing each of the gripping members to grip said belt, a drum for winding said chain for causing the same to pull said gripping members toward each other, a frame pressing against said chain and carrying said drum, and means for rotating said drum.

4. In a belt stretcher, clamping members for engaging the belt near the ends thereof, a binding screw for causing said clamping members to engage said belt, a chain passing around the ends of said clamping members, a drum engaging said chain for winding the same whereby the clamping members and the ends of the belt are drawn toward each other, and means for winding said drum.

5. In a belt stretcher, a pair of clamping members adapted to clamp the belt near the ends thereof, a chain passing around said clamping members and adapted to cause the same to clamp the belt, a drum for winding said chain, means mounted on said drum for spacing the drum from the belt, a frame engaging said belt and supporting said drum, means for rotating said drum, and means mounted on said drum for preventing a reverse rotation of said drum, the rotation of said drum causing said chain to draw the clamping member and the ends of the belt toward each other.

6. In a belt stretcher, a drum, means for winding said drum, a chain connected to said drum and adapted to be wound thereby, and a pair of clamping members engaged by said chain and pressed together thereby for gripping a belt near the ends thereof, each of said clamping members comprising a pair of slidable clamping bars, and means for initially moving said bars longitudinally of each other for causing the same to grip the belt to which the same are applied.

7. In a belt stretcher, clamping members engaging the belt near the ends thereof, said clamping members each comprising a plurality of parts one of which is formed with a concave surface and a hook shaped end, and the other of which is formed with a convex surface engaging the concave surface of the opposing part, and a hook shaped end acting in opposition to the hook shaped portion of the opposing part, means for causing said parts to grip the belt temporarily, a chain passing around the ends of said clamping members for affording a firm gripping action against the belt, a drum for winding said chain for causing the same to act against said gripping members for drawing the same toward each other, means for holding the drum in position, means for rotating the drum, and means for preventing a reverse rotation of the drum.

In testimony whereof we affix our signatures in presence of two witnesses.

LEONARD EBERLINE.
FRANK M. WANZER.

Witnesses:
G. WARD KEMP,
ALEXANDER HUTCHINSON.